(12) United States Patent
Pfaeffle et al.

(10) Patent No.: US 7,150,261 B2
(45) Date of Patent: Dec. 19, 2006

(54) METHOD AND DEVICE FOR CONTROLLING AN INTERNAL COMBUSTION ENGINE

(75) Inventors: Andreas Pfaeffle, Wuestenrot (DE); Stefan Polach, Stuttgart (DE); Dietmar Stapel, Korntal Muenchingen (DE); Oliver Brox, Stuttgart-Weilimdorf (DE); Matthias Wild, Preimd (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/192,581

(22) Filed: Jul. 28, 2005

(65) Prior Publication Data

US 2006/0054131 A1  Mar. 16, 2006

(30) Foreign Application Priority Data

Aug. 26, 2004  (DE)  ............ 10 2004 041 218

(51) Int. Cl.
*F02D 41/38* (2006.01)

(52) U.S. Cl. .................................................... 123/299

(58) Field of Classification Search ............... 123/299; 60/274, 285, 295, 297

See application file for complete search history.

(56) References Cited

U.S. PATENT DOCUMENTS

| 6,491,016 | B1* | 12/2002 | Buratti ........................ 123/299 |
| 6,666,020 | B1* | 12/2003 | Tonetti et al. ............... 123/299 |
| 6,901,747 | B1* | 6/2005 | Tashiro et al. .............. 123/299 |
| 6,993,901 | B1* | 2/2006 | Shirakawa ................... 60/295 |
| 2003/0182934 | A1* | 10/2003 | Adler et al. ................. 123/299 |

* cited by examiner

*Primary Examiner*—T. M. Argenbright
(74) *Attorney, Agent, or Firm*—Kenyon & Kenyon LLP

(57) ABSTRACT

A device and a method for controlling an internal combustion engine in which a fuel-quantity variable is ascertained on the basis of at least one torque variable. For at least two operating modes the fuel-quantity variable is ascertained according to two different procedures.

7 Claims, 1 Drawing Sheet

METHOD AND DEVICE FOR CONTROLLING AN INTERNAL COMBUSTION ENGINE

FIELD OF THE INVENTION

The present invention relates to a method and a device for controlling an internal combustion engine, in particular an internal combustion engine having direct injection.

BACKGROUND INFORMATION

In methods and devices for controlling an internal combustion engine the desired torque is ascertained on the basis of the driver input and converted into a fuel quantity to be injected. Preferably, an overall injection quantity to be injected during an injection cycle is specified.

The overall injection quantity resulting in this conversion relates exclusively to a specific operating mode of the engine. In a diesel engine, for instance, one operating mode is lean-combustion operation with conventional diesel combustion. The operating mode determines the efficiency of the fuel conversion into torque. If additional operating modes are used, such as an operating state in which a particle filter is regenerated, this efficiency changes. As a result, the conversion of torque into fuel quantity no longer provides the correct results. This efficiency deterioration is attributable to the fact that during the regeneration fuel is injected at an angular dimension that renders only a slight or no contribution to the overall torque. To achieve the desired torque, the fuel quantity may thus have to be corrected accordingly. Such a correction in the individual operating modes has the disadvantage that each additional operating mode has a dependence on every other operating mode.

SUMMARY OF THE INVENTION

The mutual dependence of the conversion involves considerable effort when the functionality of conversion between torque and overall injection quantity is applied. To reduce the application complexity, the present invention provides that the fuel quantity for each operating mode be ascertained according to a different procedure.

DETAILED DESCRIPTION

Figure 1:
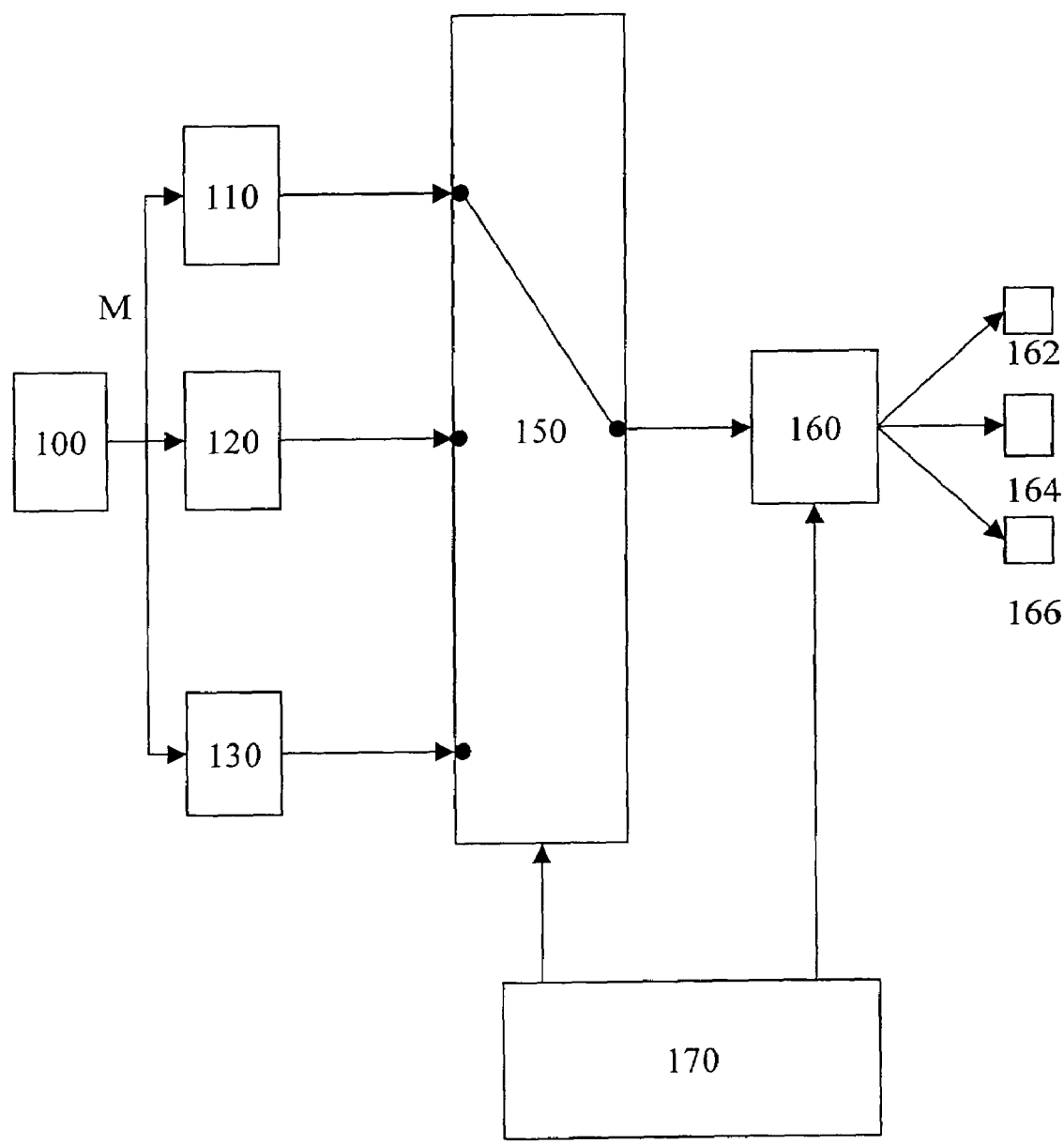
FIG. 1 shows a block diagram of the procedure according to the present invention.

In FIG. 1, the procedure of the present invention is described using as an example an internal combustion engine having self-ignition. The procedure according to the present invention is not restricted to such an internal combustion engine. It may be used in a wide variety of internal combustion engines where a fuel quantity to be injected must be predefined on the basis of the desired torque. This specifically applies to all directly-injecting internal combustion engines and to internal combustion engines having self-ignition.

A torque setpoint selection is denoted by 100 in FIG. 1. It applies a signal M regarding the desired torque to a first procedure 110. Analogously, the corresponding second signal acts on a second setpoint selection 120. Signal M concerning the desired torque is applied to a third setpoint selection 130 as well. Three procedures 110, 120 and 130 are shown in FIG. 1. The procedure according to the present invention is not limited to this number of procedures, but may be used for any other number of procedures, at least two procedures being required. First procedure 110, second procedure 120, and third procedure 130 each act upon an input of a switchover means 150, optionally connecting one of its inputs to an output of switchover means 150. Switchover means 150 applies the corresponding input signal of switchover means 150 to a quantity distribution 160. Quantity distribution 160 acts upon different partial-injection quantity setpoint selections 162, 164 and 166. Control 170 applies corresponding trigger signals to switchover means 150 and quantity distribution 160.

Torque setpoint selection 100 calculates a desired torque M on the basis of the driver input, which is preferably detected by a sensor, and possibly additional operating parameters. This desired torque M indicates how much torque the driver is requesting. First procedure 110, second procedure 120 and third procedure 130 calculate the required fuel quantity on the basis of this desired torque M and possibly additional operating parameters, the procedures preferably calculating the overall injection quantity. The individual efficiency is entered as essential variable in the conversion of torque into quantity. The efficiency is essentially determined by the timing of the injection. If the fuel injection is implemented before or in the region of top dead center, the entire injected fuel quantity will be converted into torque, the efficiency assuming value 1 in this case. If the injection takes place very late after top dead center, the fuel reaches the exhaust system in more or less uncombusted form. In this case the efficiency will assume values that are smaller than 1.

Such a transition of the fuel or the partially converted fuel into the exhaust system is especially desirable in operating states in which the exhaust-gas aftertreatment system is being regenerated. Such an exhaust-gas aftertreatment system to be regenerated may include, for example, a particle filter, an oxidation catalyst, a nitrogen oxide catalyst and/or other catalysts. Hereinafter, a regeneration operation of this type will be referred to as operating mode.

The first operating mode is usually normal operation during which the fuel is completely converted into torque. A second operating mode may be, for instance, a regeneration operation of a particle filter, and the third operating mode may be a regeneration operation of the nitrogen oxide catalyst. According to the present invention, first procedure 110 now implements the conversion of torque into fuel quantity in the first operating mode, and second procedure 120 implements it in the second operating mode, and third procedure 130 in the third operating mode.

If additional operating modes are provided, additional procedures must be provided in an analogous manner.

In the respective operating mode, the procedures calculate the fuel quantity to be injected as a function of the desired torque and additional operating parameters. The efficiency of the combustion must be considered another essential operating parameter to be entered in the conversion.

According to the present invention the first, second and third procedures differ in that different efficiencies are used to convert the torque into the quantity, i.e., the efficiency assumes different values for at least two different operating modes.

As an alternative or in addition, first procedure 110, second procedure 120 and/or third procedure 130 calculate(s) the fuel quantity to be injected according to different rules on the basis of the torque, i.e., using the same input variables, the output variable is calculated in a different manner. This may be realized, for instance, by using different characteristics maps with the same input variables. As a result, different dependencies of the fuel quantity variable from the output variables are used in at least two different operating modes.

Furthermore, it may be provided that the first procedure, the second procedure and/or the third procedure use(s) not only different characteristics maps but also different input variables. In other words, in at least two different operating modes different rules are utilized to ascertain the fuel-quantity variable.

In addition, it may be provided that different operating-parameters are used in different operating modes. In particular the air mass, the ratio of fuel quantity and air mass, and/or the exhaust-recirculation rate may be utilized as operating parameters. Instead of these variables, variables characterizing these variables may be used as well.

If the first procedure corresponds to the first operating mode during which the internal combustion engine is operated in normal operation, i.e., only injections fully combusting at efficiency 1 take place. In this case it is provided, for instance, that the fuel quantity to be injected directly results from the torque and the efficiency. This means, that the fuel quantity to be injected is stored in a characteristics map on the basis of the two input variables. If the second operating mode corresponds to the regeneration of a particle filter in which fuel is injected considerably later than top dead center, the fuel combusting only partially, it may be provided, for instance, that an efficiency smaller than 1 be assumed, which takes on a fixed value. On the basis of this fixed value and the desired torque, the fuel quantity to be injected results by the same conversion or even with the same characteristics map as in first procedure 110. As an alternative, the fuel quantity to be produced for the requested torque is also able to be calculated analogously to the first procedure, and a quantity required for the regeneration of the exhaust-gas aftertreatment system be added subsequently.

The corresponding procedures for converting the torque into fuel quantity thus differ in the action by which the conversion is implemented and/or in the utilized variables and/or the values of the used variables. Considered an essential variable in this context is the efficiency.

Control 170 then selects the appropriate output signal of the corresponding procedure as a function of the actual operating mode and forwards it to quantity distribution 160. In quantity distribution 160, the fuel quantity to be injected will then be apportioned to the individual partial injections 162, 164 and 166 as a function of the operating mode, i.e., in normal operation, for example, the injection quantity is distributed between a main injection and at least one pre-injection. In the regeneration of a particle filter operating state, the injection quantity is split between a main injection and at least one post-injection and possibly a pre-injection. This distribution in turn is a function of the operating mode.

What is claimed is:

1. A method for controlling an internal combustion engine, comprising:
    ascertaining a fuel-quantity variable on the basis of at least one torque variable and an efficiency of an operating mode; and
    determining the fuel-quantity variable according to two different procedures for at least two operating modes.

2. The method according to claim 1, wherein different rules are used to ascertain the fuel-quantity variable in different operating modes.

3. The method according to claim 1, wherein the efficiency assumes different values for at least two different operating modes.

4. The method according to claim 1, wherein different operating parameters are used in different operating modes.

5. The method according to claim 1, wherein different dependencies of the fuel-quantity variable from output variables are used in different operating modes.

6. The method according to claim 1, further comprising dividing the ascertained fuel quantity among at least two partial injections.

7. A device for controlling an internal combustion engine, comprising:
    an arrangement to determine a fuel-quantity variable on the basis of at least one torque variable and an efficiency of an operating mode, the fuel-quantity variable being ascertained for at least two operating modes according to two different procedures.

* * * * *